(12) United States Patent
Wynings

(10) Patent No.: US 7,591,323 B2
(45) Date of Patent: Sep. 22, 2009

(54) HYDRAULIC DRIVE AERATOR

(76) Inventor: Ross Wynings, 7846 Sagamore Dr. N., Liverpool, NY (US) 13090

( * ) Notice: Subject to any disclaimer, the term of this patent is extended or adjusted under 35 U.S.C. 154(b) by 314 days.

(21) Appl. No.: 11/499,422

(22) Filed: Aug. 4, 2006

(65) Prior Publication Data

US 2008/0029278 A1 Feb. 7, 2008

(51) Int. Cl.
*A01B 45/02* (2006.01)
(52) U.S. Cl. ............................ 172/21; 172/43; 172/240
(58) Field of Classification Search .................. 172/21, 172/22, 42, 43, 240, 243, 255, 329, 351, 172/395; 37/248; 111/131
See application file for complete search history.

(56) References Cited

U.S. PATENT DOCUMENTS

| 2,314,035 | A | * | 3/1943 | Emanuel | 172/21 |
|---|---|---|---|---|---|
| 3,881,553 | A | * | 5/1975 | Angeski | 172/22 |
| 4,192,387 | A | * | 3/1980 | Stinson | 172/21 |
| 4,336,760 | A | * | 6/1982 | Cohen et al. | 111/131 |
| 4,867,244 | A | * | 9/1989 | Cozine et al. | 172/22 |
| 5,398,768 | A | * | 3/1995 | Staples | 172/21 |
| 5,613,565 | A | * | 3/1997 | Kelly | 172/21 |
| 5,673,756 | A | * | 10/1997 | Classen | 172/22 |
| 6,102,129 | A | * | 8/2000 | Classen | 172/21 |
| 6,585,451 | B2 | * | 7/2003 | Wynings | 404/131 |
| 6,860,334 | B2 | * | 3/2005 | Yamazaki et al. | 172/42 |
| 7,392,854 | B2 | * | 7/2008 | Ikeda et al. | 172/43 |
| 7,401,425 | B2 | * | 7/2008 | Friberg et al. | 37/241 |
| 2001/0027869 | A1 | * | 10/2001 | Vought | 172/122 |

* cited by examiner

*Primary Examiner*—Robert E Pezzuto
*Assistant Examiner*—Matthew D Troutman
(74) *Attorney, Agent, or Firm*—Bernhard P. Molldrem

(57) ABSTRACT

A walk-behind lawn aerator has a left and right aerator reels both journalled side by side on the same axle and rotatable independently of one another. Left and right hydraulic drives provide motive power to the left and right reels, and each is capable of rotating the associated reel forward, reverse, or at intermediate speeds. A wheel boom carries front wheels, and is raised and lowered using a hydraulic cylinder. With the wheel boom lowered, the unit is capable of a zero-radius turn.

12 Claims, 3 Drawing Sheets

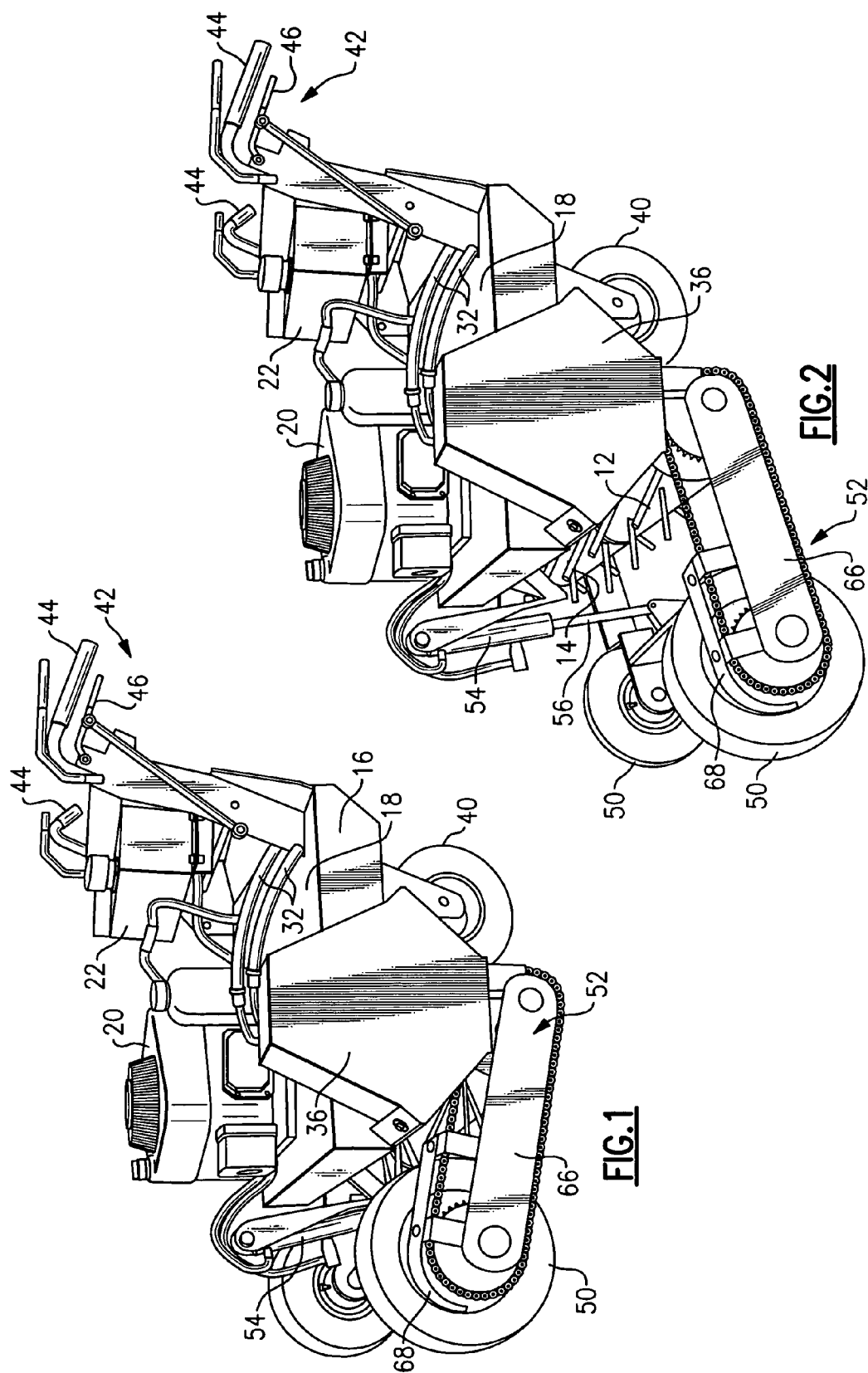

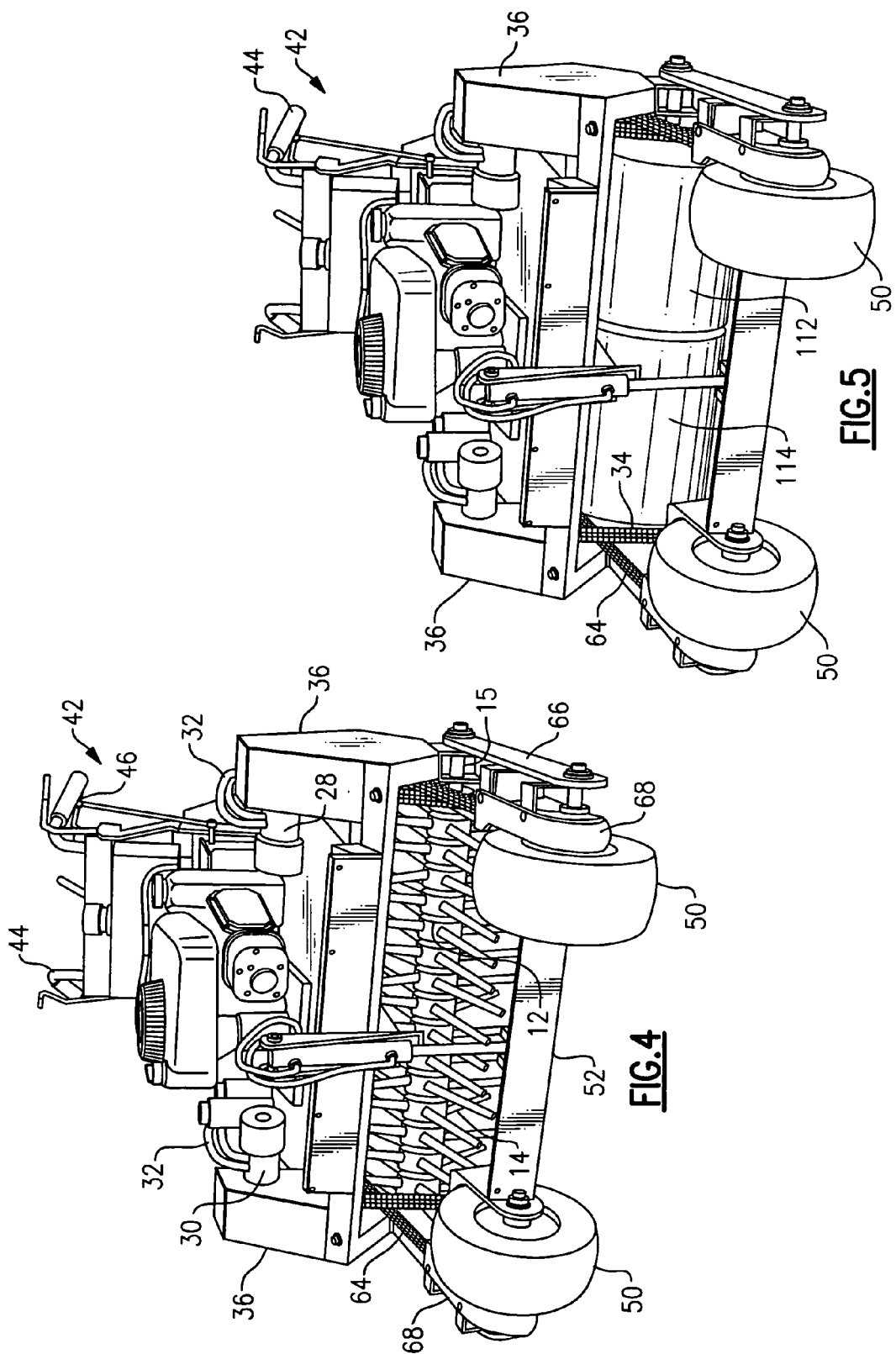

HYDRAULIC DRIVE AERATOR

BACKGROUND OF THE INVENTION

This invention relates to lawn and landscaping equipment, and is more particularly directed to self-powered equipment for piercing and aerating the soil. The invention is specifically directed to a walk-behind lawn aerator that permits an operator to control the direction and speed of travel with great precision, and without risk of damage to the lawn, or to pavement or soil.

There now exists a need for a convenient method for aerating existing lawns. At the present time what exists for this purpose is a aerator unit that has to be pulled or dragged by hand, or a aerator that has to be towed behind a tractor. These units are capable of only slow and awkward operation, and are difficult to use on uneven or rolling terrain. What is needed is a power aerator that is easy to move about on a yard or lawn, without having to be pushed, pulled, or towed, and which can be easily turned, without damaging the lawn, at the end of each row. In order to aerate the soil in areas near trees, buildings, or other structures, the lawn roller should be turnable in a small radius as possible, but without noticeable damage to the lawn. In addition, to increase the mobility of the unit between work sites, it should be capable to roll or drive the unit up onto, and off, a truck bed or trailer.

A hydraulic lawn roller mechanism, with a split roller, is described in my earlier U.S. Pat. No. 6,585,451, and the description of that unit is incorporated herein by reference. That unit has the advantages of independent operation of the left and right drums, so it can be easily controlled and turned. However, an aerator has an aerator reel, i.e., a spindle or rotor with numerous spikes or projections, which are intended to pierce the surface of the soil. Thus, if the aerator reel is simply substituted for the lawn roller drum, the unit would have difficulty turning sharply at the end of a row, and could not turn within its own radius without tearing the lawn at that location.

Hydraulic drive mechanisms have recently been employed in walk-behind self-propelled lawn mowers, one example of which is described in Zvolanek U.S. Pat. No. 5,518,079. Those lawn mowers have separate hydraulic drive motors associated with the drive wheel on each side of the mower, and the operator can control the speed and direction of travel by squeezing control levers on the handle. However, despite the longstanding need for an improved lawn aerator, no one has yet seen a way to incorporate the drive mechanism of this type of lawn mower into a split drum lawn roller, and avoid the problems mentioned above.

OBJECTS AND SUMMARY OF THE INVENTION

Accordingly, it is an object of the invention to provide an effective and efficient technique for aerating an existing lawn with a power aerator machine that is uncomplicated to use and which can follow the terrain easily.

It is another object to provide a an improved self-propelled lawn aerator for large lawn spaces, which may be employed at golf courses, athletic fields, or parks, and which may be used in lawn care for commercial and residential applications.

It is a further object to provide a lawn aerator that may be of increased width, and which may be used without difficulty and without a need to pull, push or tow it.

It is a still further object to provide a lawn aerator that can be turned in a zero radius turn without damage to the lawn.

It is still another object to provide a lawn aerator that can be easily and quickly converted to a lawn roller, with interchangable split aerator spindle and split roller drum.

According to an aspect of this invention, a walk-behind power lawn aerator permits an operator walking behind it to control the direction and speed of travel with great precision. The lawn aerator has a frame that holds a transverse axle. A left aerator reel and a right aerator reel are both journalled side by side on the axle and are rotatable independently of one another. A motor is mounted on said frame above the aerator reels. There are separate left and right independent drive mechanisms, which each are powered by the motor. These drive mechanism provide motive power to the left and right aerator reels, respectively. These drive mechanisms are each capable of rotating the associated reel at a forward speed and at a reverse speed. Further, the left and right drive mechanisms include a continuous drive web situated at a respective end of said frame, and each web engages a drive sprocket situated at an outboard end of the associated aerator reel.

A control handle assembly extends from the frame to an operator position behind the frame, where there are left and right control handles operatively coupled to the associated drive mechanisms, permitting the operator to control the rotation speed of each of the reels.

In addition, left and right front drive wheels are mounted on a front boom and there is an operator controlled mechanism for moving the boom between an elevated position and a lowered position. In the elevated position the front drive wheels are raised and the aerator machine is supported on said aerator reels, while in the lowered position the machine is supported on the drive wheels and the left and right aerator reels are raised out of contact with the ground. On the boom there are left and right drive webs each coupled between a respective one of the drive sprockets and the associated drive wheel. This transfers the controlled drive power to the wheels when the wheel boom is lowered, so that the operator can turn the machine with the aerator reels held off the ground, and can roll the machine onto or off a truck or trailer.

In a preferred embodiment, a caster wheel is disposed on the frame behind the aerator reels. Favorably, the drive mechanism can include left and right hydraulic pumps coupled to an output shaft of the motor, and associated left and right hydraulic motors, each coupled to the respective aerator reel. In the disclosed embodiment, the hydraulic motors have speeds that are infinitely variable between a maximum forward speed and a maximum reverse speed, and continuous web drive mechanisms, e.g., a belt drive or chain drive, connect the respective drive motor and aerator reel.

The mechanism for moving the front wheel boom between its elevated and lowered positions can include a hydraulic actuator, e.g., a hydraulic cylinder, mounted on the frame and on the boom, and the can be a hydraulic pump for this that is powered by the motor, with an operator control on the handle to permit the operator to raise and lower the boom and front drive wheels.

Safety covers can be situated over the drive webs at the respective left and right ends of the frame, and may extend over web drive mechanism on the boom.

In some cases, the aerator reels can be removable from the axle or shaft, and can be fitted with an interchangable pair of roller drums. This permits the aerator to be reconfigured in the field as a lawn roller, so that the same machine can do double-duty, i.e., both as an aerator machine and as a lawn roller.

As aforesaid, when the boom is in the elevated position, the front drive wheels are raised and the aerator machine is supported on the aerator reels; and with the boom in the lowered position the machine is supported on the drive wheels, and the left and right aerator reels are raised. When the boom is in its lowered position, the rotation of the left and right front drive wheels can each be controlled between a full forward speed, through a null speed, to a full reverse speed. Directional control is entirely at the discretion of the operator. This arrangement allows the operator to move the lawn roller in a forward, reverse, left, or right direction, with the lawn roller responding immediately to the operator's hand actions on the squeeze levers. The wheels can be rotated in different directions at the same time, allowing the operator to spin the machine at its own center.

The propulsion system may be a gasoline engine, or may be any other available power source.

The above and many other objects, features, and advantages of this invention will become apparent to persons skilled in the art from the ensuing description of a preferred embodiment, which should be considered in connection with the accompanying Drawing.

BRIEF DESCRIPTION OF THE DRAWING

FIGS. 1 and 2 are side perspective views of a power aerator according to one embodiment of this invention.

FIG. 4 is a front perspective view of this embodiment.

FIG. 5 is a front perspective view of this embodiment, reconfigured for a lawn roller implementation.

DETAILED DESCRIPTION OF A PREFERRED EMBODIMENT

Figure 3:
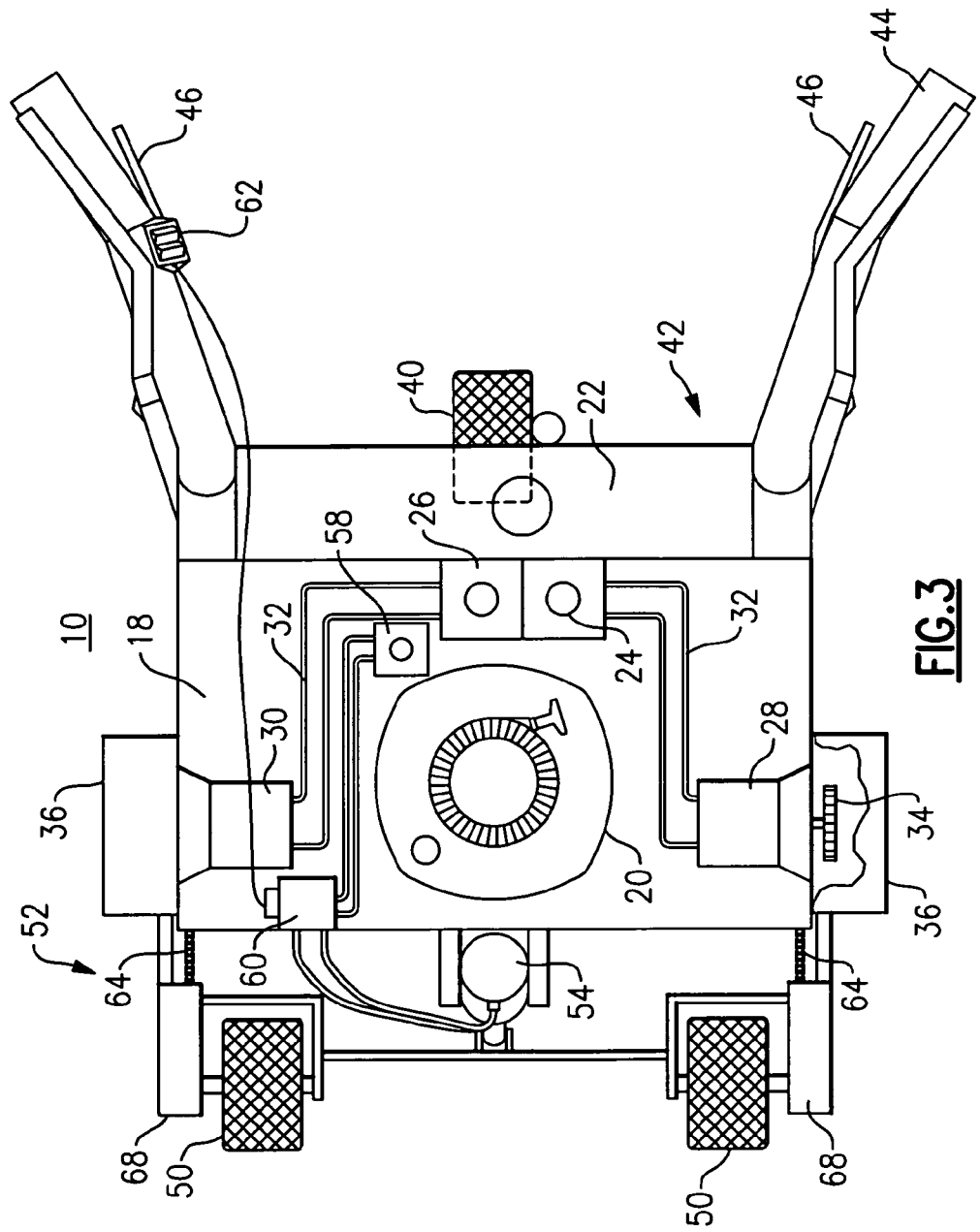
FIG. 3 is a top plan view thereof.

With reference to the Drawing, and initially to FIGS. 1 to 4 thereof, one preferred embodiment of the split drum aerator 10 has a left aerator reel 12 and a right aerator reel 14, both situated on the same axis, to wit, a transverse axle 15. A frame 16 has a central platform 18 on which a gasoline engine 20 is supported, with a fuel tank 22 situated above the engine 20. There are left and right hydraulic pumps 24 and 26 on the platform 18 and connected to the output shaft of the engine 20, and there are left and right hydraulic motors 28, 30 on the frame near the outboard ends of the drums, and these are connected by hydraulic hoses 32, 32 to the respective pumps 24, 26. At each end of the frame there is a chain drive 34, 34 for transferring rotary motion from the respective hydraulic motor to the associated aerator reel 12, 14. While a chain drive is shown here, other continuous web drives may be employed, such as a toothed belt drive. Safety covers 36, shown on each side of the frame 16 in FIGS. 2 and 4, may be present over the upper sprocket of the chain drives. One cover 36 is shown partly cutaway in FIG. 3 to shown one chain drive 35. The chain drives 34 are also partly visible in FIG. 4.

A caster rear wheel 40 is mounted centrally on the frame 16 behind the reels, and serves to balance the aerator 10. This can rotate about its vertical axis over 360 degrees, to permit the wheel 42 to follow the motion of the aerator, even in the case of a zero radius turn, which is to be described shortly. The castor wheel 40 has a tire that is generally flat across its width.

A handle bar assembly 42 is situated on the rear side of the frame 16, with hand grips 44 for the operator, and left and right squeeze levers 46, with linkages (not shown) that connect to the hydraulic pumps 24, 26, to permit the operator to control the direction and amount of flow through the hydraulic hoses 32 to the hydraulic motors 28, 30. This permits the operator to control the speed of rotation of each of the two reels 12, 14, independent of one another, anywhere between a full-forward speed, through null, to a full reverse speed. In this embodiment, the speeds are infinitely variable between full forward and full reverse, but in other embodiments, there be discrete intermediate speeds. Also, it is preferred that when the operator takes his or her hands from the squeeze levers, the speed reverts to null, or not rotating.

On the aerator 10 there is a motor control lever and a tank or reservoir for the system hydraulic fluid.

The axle 15 can be a 1¼-inch shaft, extending between sides of the frame, and optionally can be supported at its center by a center support brace that extends into the gap between the two aerator reels 12, 14. At the axis of each aerator reel is a tubular core member that is journalled by means of bearings onto the axle or shaft 15. There are left and right drive sprockets for the respective chain drives, mounted on the outboard ends of the respective aerator reels.

By squeezing up on both squeeze levers 46, 46 the operator causes the aerator 10 to move forward, i.e., straight ahead, and by pulling the levers down, the operator causes the lawn roller to back straight up. Steering is accomplished by squeezing one lever 46 more than the other so that the two reels 12, 14 turn at different speeds. By pulling up on one lever and squeezing the other down, the operator can cause one reel 12 to rotate forward and the other reel 14 to rotate reversely.

Shown at the front of the aerator 10 are a pair of front wheels 50, 50 supported on a front wheel boom 52. The wheel boom pivots at the axis of the aerator reels 12 and 14, and is moved between a normal, raised position (FIG. 1) and a lowered position (FIG. 2) by means of a hydraulic actuator or cylinder 54. The cylinder is mounted on the frame 16 of the aerator, and has its rod 56 coupled to the boom 52. A small hydraulic pump 58 (FIG. 3) provides hydraulic fluid pressure to a small solenoid valve 60, that is controlled by a switch 62 positioned on the handle bar assembly 42. When the operator actuates this switch 62, the cylinder 54 depresses the boom to its lowered position as shown in FIG. 2. When the operator returns the switch 62 to the other position, the cylinder 54 lifts the boom back to the raised position shown in FIG. 1.

There are auxiliary chain drives 64 that couple the wheels 50 with the respective drives 34 for the reels 12, 14, so that the wheels rotate with the respective aerator reels. This arrangement allows the operator to execute a zero-radius turn, by first actuating the switch 62 to move the boom down to the lowered position, to raise the aerator reels up off the turf. Then, by pulling up on one of the control squeeze levers 46 while pushing down on the other, the wheels 50 are rotated in opposite directions. The rear wheel 40 pivots so that it follows this narrow turn. This then causes the aerator 10 to spin about its center, i.e., to effect a zero-radius turn. The zero-radius turn carried out with this embodiment typically does not damage the lawn. The machine can be turned in any direction.

The wheel boom 52 and front wheels 50, 50 can also be used when loading and unloading the aerator machine from a truck bed or trailer.

The front wheel boom 52 of this embodiment also has side protective plates 66 and chain guards 68, for operator safety.

In this embodiment, the front wheel boom 52 pivots or swings between the raised and lowered positions. In other possible embodiments, the wheels may be raised and lowered linearly, or the boom arrangement may move about a different axis.

As shown in FIG. 6, a pair of cylindrical roller drums 112, 114 can be field-installed or interchanged for the aerator reels 12, 14. The axle 15 can be detached, and each of the left and right reels 12 and 14 can be slid off. Then, the left and right roller drums 112 and 114 can be placed on the axle 15, and this assembly can be re-attached as shown. The process of removing the reels and installing the roller drums only takes about a quarter hour. This feature makes it possible for the same machine to do double duty, that is, the operator can use the machine for aerating lawns, and then by simply interchanging the lawn roller drums for the aerator reels, the same operator can use the same machine for rolling lawns. This interchange can be done in the field does and thus does not require returning to the main shop, and avoids having to bring multiple large lawn machines. After completing the lawn rolling, the process is reversed, with the operator removing the drums and replacing the aerator reels.

While the invention has been described in reference to a preferred embodiment, it should be understood that the invention is not limited to that precise embodiment. Rather, many modifications and variations will present themselves to those skilled in the art without departing from the scope and spirit of the invention, as defined in the appended claims.

I claim:

1. A walk-behind power lawn aerator machine that permits an operator walking behind it to control the direction and speed of travel with great precision; comprising
   a frame including a transverse axle, the axle being mounted at a fixed location on the frame;
   a left aerator reel and a right aerator reel both journalled side by side on said axle and rotatable independently of one another;
   an engine mounted on said frame and positioned above said aerator reels;
   separate left and right independent drive means each powered by said engine and providing motive power to said left and right aerator reels respectively; each capable of rotating the associated reel at a forward speed and at a reverse speed; wherein each of said left and right drive means includes a continuous drive web situated at a respective end of said frame, and engaging a drive sprocket situated at an outboard end of the associated aerator reel;
   a control handle assembly that extends from the frame to an operator position behind the frame, having left and right control handles each operatively coupled to the associated drive means permitting an operator to control the rotation speed of each of said reels;
   left and right front drive wheels; and
   a front boom on which said left and right front drive wheels are mounted at a location forward of said axle and said aerator reels, the front boom having a pivot axis on the transverse axle on which the aerator reels are mounted, and including means for moving said boom about the pivot axis thereof between an elevated position and a lowered position, wherein, in the elevated position the front drive wheels are raised and the aerator machine is supported on said aerator reels, and in the lowered position the machine is supported on the drive wheels and the left and right aerator reels are raised; wherein said left and right drive wheels are each supported on a respective independent axle; and wherein said left and right drive means include respective left and right drive mechanisms connecting the drive wheel with its associated aerator reel, such that when the boom is lowered and said machine is supported in the drive wheels, the operator can turn the machine by use of said left and right control handles.

2. The power lawn aerator according to claim 1 wherein said boom includes left and right drive webs each coupled between a respective one of said drive sprockets and an associated one of said drive wheels.

3. The power lawn aerator according to claim 1, further comprising a caster wheel disposed on said frame behind said roller drums.

4. The power lawn aerator according to claim 1, wherein drive means include left and right hydraulic pumps coupled to an output of said engine, and associated left and right hydraulic motors coupled to the respective aerator reel.

5. The power lawn aerator according to claim 4, wherein said hydraulic motors have speeds that are infinitely variable between a maximum forward speed and a maximum reverse speed.

6. The power lawn aerator according to claim 4, wherein said left and right drive mechanisms respectively include a continuous web drive mechanism connecting the respective drive motor and aerator reel.

7. The power lawn aerator according to claim 1, wherein said means for moving said boom between an elevated position and a lowered position includes a hydraulic actuator mounted on said frame and on said boom, a hydraulic pump powered by said engine, and a control on said handle to permit the operator to raise and lower said boom and front drive wheels.

8. The power lawn aerator according to claim 1, further comprising safety covers situated over the drive webs at the respective left and right ends of the frame.

9. The power lawn aerator according to claim 6, further comprising safety covers situated over the web drive mechanism on said boom.

10. The power lawn aerator according to claim 1, wherein said transverse axle includes means permitting the operator to field-detach the axle from said frame; said left and right aerator reels are removably mounted upon said transverse axle and include means permitting the reels to slide off said transverse axle; and further comprising left and right roller drum portions that are adapted to be interchangeably field-mounted upon said transverse axle.

11. A walk-behind power lawn aerator that permits an operator walking behind it to control the direction and speed of travel with great precision; comprising a frame including a transverse axle, said transverse axle being mounted at a fixed location on the frame; a left aerator reel and a right aerator reel both journalled side by side on said axle and rotatable independently of one another; an engine mounted on said frame and positioned above said aerator reels; separate left and right independent drive means each powered by said engine and providing motive power to said left and right aerator reels, respectively; each capable of rotating the associated reel at a forward speed and at a reverse speed; a control handle assembly that extends from the frame to an operator position behind the frame, having left and right control handles each operatively coupled to the associated drive means permitting an operator to control the rotation speed of each of said aerator reels, wherein each of said left and right drive means includes a respective hydraulic pump that is coupled to an output of the engine, an associated hydraulic motor coupled to a respective continuous drive web situated at a respective end of said frame, and engaging a drive sprocket situated at an outboard end of the associated aerator reel, hydraulic hoses connecting between the hydraulic pump and the associated hydraulic motor, and linkage means connecting between the associated control handle and the respective hydraulic motor, such that the operator may control the rotation speed of each of the two roller drums, independent of each other; left and right front drive wheels; a front boom on which said left and right front drive wheels are mounted at a location forward of said aerator reels, the front boom having a pivot axis on the transverse axle on which said aerator reels are journalled, a hydraulic cylinder mounted between said frame and said boom for moving said boom about the pivot axis thereof between an elevated position and a lowered position, wherein, in the elevated position the front drive wheels are raised and the aerator machine is supported on said aerator reels, and in the lowered position the machine is supported on the drive wheels and the left and right aerator reels are raised; and left and right drive webs each coupled between a respective one of said drive sprockets and an associated one of said drive wheels, such that when the boom is in its lowered position, the rotation of the left and right front drive wheels can each be independently controlled between a full forward speed, through a null speed, to a full reverse speed, such that the operator can turn the aerator machine by actuating said left and right control handles and differentially rotating said left and right drive wheels.

12. The walk-behind aerator according to claim 11, wherein said transverse axle includes means permitting the operator to detach the axle from the frame; and wherein left and right aerator reels include means permitting the reels to slide off said transverse axle such that the are removably mounted upon a transverse axle and field-removable therefrom; and further comprising left and right roller drum portions that are adapted to be interchangeably mounted by the operator in the field upon said transverse axle.

* * * * *